United States Patent [19]

Inoue et al.

[11] Patent Number: 5,584,490
[45] Date of Patent: Dec. 17, 1996

[54] METAL GASKET WITH COOLANT CONTACT AREAS

[75] Inventors: Kunitoshi Inoue, Higashiosaka; Masahiko Miura, Kawachinagano; Kazukuni Takada, Ibaragi; Hideo Yamamoto, Miura; Michio Katoh, Yokosuka; Tetsuhiro Hosokawa; Hitoshi Shimamura, both of Toyota, all of Japan

[73] Assignee: Nippon Gasket Co., Ltd., Osaka-fu, Japan

[21] Appl. No.: 466,423

[22] Filed: Jun. 6, 1995

[30] Foreign Application Priority Data

Aug. 4, 1994 [JP] Japan ................................. 6-201532

[51] Int. Cl.⁶ ...................................................... F16J 15/08
[52] U.S. Cl. .................................................. 277/235 B
[58] Field of Search ............................... 277/22, 235 B, 277/235 A

[56] References Cited

U.S. PATENT DOCUMENTS

| | | | |
|---|---|---|---|
| 2,060,498 | 11/1936 | Gobb | 277/22 |
| 2,134,868 | 11/1938 | Fitzgerald | 277/235 B |
| 2,191,050 | 2/1940 | Trice | 277/22 |
| 3,603,599 | 9/1971 | Laird | 277/22 |
| 4,300,273 | 11/1981 | Lockhart . | |
| 4,451,051 | 5/1984 | Nicholson . | |
| 4,714,260 | 12/1987 | Udagawa . | |
| 4,834,399 | 5/1989 | Udagawa et al. | 277/235 B |
| 4,968,045 | 11/1990 | Abe et al. . | |
| 4,979,758 | 12/1990 | Miyaoh . | |
| 5,269,541 | 12/1993 | Inamura | 277/235 B |

FOREIGN PATENT DOCUMENTS

| | | | |
|---|---|---|---|
| 0509672 | 10/1992 | European Pat. Off. . | |
| 533357 | 3/1993 | European Pat. Off. | 277/235 B |
| 64-73156 | 3/1989 | Japan . | |
| 4-66457 | 6/1992 | Japan . | |
| 58418 | 3/1994 | Japan | 277/235 B |
| 147326 | 5/1994 | Japan | 277/235 B |
| 235464 | 8/1994 | Japan | 277/22 |
| 2241025 | 8/1991 | United Kingdom | 277/235 B |

*Primary Examiner*—Scott Cummings
*Attorney, Agent, or Firm*—Browdy and Neimark

[57] ABSTRACT

This metal gasket is formed by laminating a pair of bead plates and a pair of intermediate plates, and capable of setting the temperature distribution thereof uniform by efficiently cooling high-temperature regions which are in the vicinity of swirl chambers without causing a decrease in the rigidity and strength thereof. The portions of the bead plates which are in the vicinity of the parts thereof in which the swirl chambers are positioned are provided with coolant-contact areas surrounded by half beads formed on the bead plates, these coolant-contact areas being provided with holes. The wall surfaces of these holes directly contact the cooling water flowing in a water jacket in a cylinder head, and fulfil the function of radiating the heat transmitted from a high-temperature combustion gas thereto.

10 Claims, 10 Drawing Sheets

F I G. 13
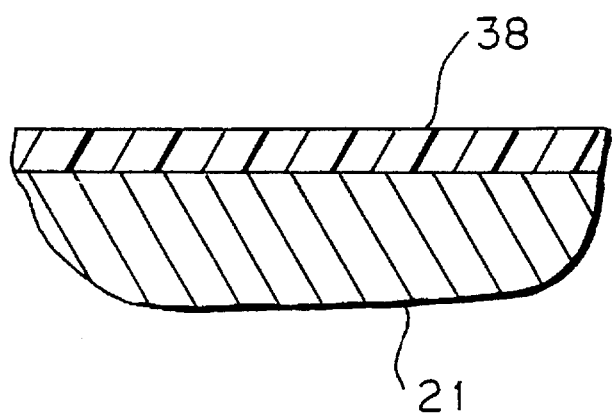

METAL GASKET WITH COOLANT CONTACT AREAS

BACKGROUND OF THE INVENTION

1. Field of the Invention

This invention relates to a metal gasket interposed between opposed surfaces of a cylinder head and a cylinder block so as to seal these surfaces.

2. Description of the Prior Art

In a conventional engine, a metal gasket comprising a bead-carrying elastic metal plate is interposed between opposed surfaces of a cylinder head and a cylinder block so as to seal a narrow space therebetween. This metal gasket is formed by making combustion chamber bores in a bead plate comprising an elastic metal plate, and then forming beads along the circumferences of these combustion chamber bores. When the metal gasket is interposed between opposed surfaces of a cylinder head and a cylinder block and fixed by tightening the same by bolts, the beads provided on the bead plate form annular elastic contact portions, i.e. seal portions against the opposed surfaces of circumferential portions of the combustion chamber bores, whereby the inner and outer portions of the combustion chamber bores can be sealed.

In a modern internal combustion engine, an increase in the efficiency and an increase in an output are demanded. Various measures are taken as means for meeting the demand, which include increasing the number of cylinders to produce a multicylinder engine, increasing the combustion temperature of the gaseous mixture, or providing swirl chambers in addition to primary combustion chambers to carry out primary combustion in swirl chambers and secondary combustion in primary chambers. Therefore, the temperature in the combustion chambers increases to a high level, and the high temperature comes to influence the metal gasket as well. Consequently, it has been demanded that a metal gasket resisting a high temperature be developed.

FIG. 9 shows a metal gasket 18 applied to an engine having a swirl chamber 7. The metal gasket 18 is provided between opposed surfaces 3, 4 of a cylinder head 1 and a cylinder block 2, and coolant-contact areas 16 are formed in a position in which a water jacket 11 in the cylinder head 1 and that 12 in the cylinder block 2 are opposed to each other, the coolant-contact areas 16 being provided with holes 17 which allow the water jackets 11, 12 to communicate with each other. In a cavity 14 formed in the cylinder head 1, a hot plug 8 defining the swirl chamber 7 is positioned and set. In a diesel engine, the hot plug 8 is provided with a glow plug and a fuel injection nozzle which are not shown. Fitted in each of the bores, the number of which corresponds to that of cylinders formed in the cylinder block 2, is a cylinder liner 15, which constitutes a cylinder 13 in which a piston 5 is reciprocatingly moved. The hot plug 8 is provided with a communication port 9 via which a primary chamber 6 formed in the cylinder 13 and the swirl chamber 7 communicate. The communication port 9 and a portion therearound in the bottom surface of the hot plug 8 directly face the primary chamber 6 but the remaining crescent-shaped region is in contact with the metal gasket 18. The combustion gases, such as flames and an unburnt gaseous mixture ejected from the swirl chamber 7 and communication port 9 transmit heat to a bottom portion 10, which forms a lower portion of the communication port 9, of the hot plug 8, so that the bottom portion 10 becomes a highest-temperature region.

The metal gasket disclosed in Japanese Patent Laid-Open No. 73156/1989 will now be roughly described with reference to FIGS. 10 and 11. A metal gasket 70 can be applied to a multicylinder engine, and comprises two bead plates 71, 72 formed by elastic metal plates and having combustion chamber bores 73 and beads 74 formed so as to extend along the circumferences of the combustion chamber bores 73, heat resisting layers of coating 75 provided on outer surfaces of the bead plates 71, 72, and an intermediate plate 76 inserted between the bead plates 71, 72. The bead plates 71, 72 are provided in the portions thereof which are around the beads 74 with coolant-contact areas 78 which the cooling water passing through the water jackets in the cylinder head or cylinder block contacts. When the metal gasket 70 is tightened between the opposed surfaces of the cylinder head and cylinder block, the nonplanar characteristics of the opposed surfaces is offset by the heat resisting layers of coating 75 to improve the sealing performance of the metal gasket. The holes 78 for communicating the cooling water jackets in the cylinder head and cylinder block with each other are provided sporadically in belt-like regions 79 which annularly surround the circumferences of the combustion chamber bores 73. The belt-like regions 79 as a whole are surrounded with parallel-extending beads 74, 77, whereby the cooling water does not leak to the outside of the belt-like regions 79. In order to prevent the separation of the layers of coating of sealing material and the circulation thereof with the cooling water in this metal gasket 70, the portions of the layers of coating which are on the belt-like regions 79 including the holes 78 are removed in advance.

In general, the metal gasket 70 is made in accordance with a design of the shape and construction of water jackets which is determined taking into consideration the conditions including the capability of cooling the cylinder head and cylinder block, the capability of removing rust from the water jackets, the capability of carrying out a cooling operation uniformly and effectively and the capability of preventing a decrease in strength. In order to maintain the cooling condition of an engine as a whole evenly and optimumly, it is not preferable to cool the engine as a whole excessively. Accordingly, the quantity of cooling water flowing between the cylinder head and cylinder block is regulated by properly determining the size of the holes 78 in the metal gasket 70. The size of the holes 78 of the metal gasket 70 is generally set smaller than that of an opening of a cooling water passage in the cylinder head or cylinder block. However, in a certain type of metal gasket, the holes are not provided, and such a metal gasket is placed in a closed state.

In the metal gasket 70, the sealing of the belt-like regions 79 including the holes 78 is done by the beads 74, 77 formed in parallel with each other so as to enclose the combustion chamber bores 73. In general, the beads for the holes formed on the bead plates in accordance with the shape of the opening of the cooling water passage in the cylinder head or cylinder block are set to annular structures in the positions scattering on the bead plates, i.e., on the circumferential portions of the combustion chamber bores so as not to cause the cooling water to leak widely to the outer surfaces of the bead plates of the metal gasket, and the bead plates to be corroded.

The metal gaskets which have been proposed include a metal gasket 70 formed as shown in FIG. 11 by inserting one intermediate plate 76 between bead plates 71, 72 comprising elastic metal plates, so as to offset the irregularity of the opposed surfaces of a cylinder head and a cylinder block more easily. Recently, a metal gasket 80 having two intermediate plates 86, 87 between bead plates 81, 82, i.e., comprising a structure of four plates in total as shown in FIG. 12 has been proposed (refer to, for example, Japanese Utility Model Laid-Open No. 66457/1992).

When a conventional metal gasket is used in an engine, a sectional surface, which constitutes an inner circumferential surface of a combustion chamber bore, of an intermediate plate, if any, and also the corresponding sectional surfaces of bead plates faces a combustion chamber, are directly exposed to a high-temperature combustion gas and receive heat from the contacting combustion gas. The heat received from the combustion gas is not rapidly radiated to the cylinder head, and it is liable to be accumulated in the interior of the metal gasket since the surfaces of the bead plates are coated with a heat resisting material. A metal gasket for a multicylinder internal combustion engine receives at the portions thereof which are close to two adjacent combustion chamber bores the supply of heat from two combustion chambers, so that the temperature of these portions is liable to become high. In a swirl chamber-carrying engine, the gases, such as flames and unburnt gaseous mixture produced after the ignition and combustion of a gaseous mixture in the swirl chambers are ejected into a primary chamber through communication ports, and the portions in the vicinity of the communication ports are specially heated with the gases, such as flames and unburnt gaseous mixture, so that the temperature of these portions is liable to become specially high.

Therefore, in a conventional metal gasket, cracks occur due to thermal stress in the portions of the bead plates and intermediate plate which are heated to a high temperature. A permanent set in fatigue also occurs in such portions due to a decrease in strength ascribed to a high temperature, to cause a decrease in the sealing function and durability of the gasket. Therefore, a conventional metal gasket has a problem that this bad influence upon the structural rigidity and strength thereof has to be reduced to as great an extent as possible.

SUMMARY OF THE INVENTION

A primary object of the present invention is to solve these problems, and provide a metal gasket capable of preventing the occurrence of cracks therein and maintaining its sealing function and durability by efficiently radiating the heat of the regions, the temperature of which is liable to increase to a high level, with cooling water and without reducing the rigidity and strength of the gasket, by designing an elaborate structure, i.e., by increasing the area of surfaces which the cooling water of the coolant-contact areas contacts directly, and thereby determining the temperature distribution of the gasket uniform and reducing the thermal stress.

Another object of the present invention is to provide a metal gasket interposed between a cylinder head and a cylinder block and having bead plates which comprise elastic metal plates provided with combustion chamber bores and beads along the circumferences of the combustion chamber bores, and an intermediate plate provided between the bead plates, locally high-temperature regions of the bead plates being provided with coolant-contact areas which the cooling water flowing in water jackets in the cylinder block and cylinder head contacts, annular half beads which surround the coolant contact areas being provided on the bead plates, and holes being provided in the coolant-contact areas of the base plates.

The surfaces of the portions of the bead plates which include parts provided with the coolant-contact areas are coated with a heat resisting material. The holes in the coolant-contact areas of the bead plates are provided in at least the bead plate which is positioned on the side of the cylinder head. The portions of the intermediate plate which are opposed to the hole-carrying portions of the bead plates constitute shield portions for shutting off a flow of cooling water between the water jackets in the cylinder block and cylinder head. The coolant-contact areas are provided on the portions of the bead plates at which the water jackets in the cylinder block and cylinder head are opposed to each other.

The metal gasket is formed in this manner. Accordingly, when the metal gasket is tightened between the opposed surfaces of the cylinder head and cylinder block, the beads formed along the circumferences of the combustion chamber bores seal the narrow clearance between these opposed surfaces to prevent combustion gas in the combustion chambers from leaking. Also, in the coolant-contact areas provided on some portions of the circumferences of the beads for the combustion chamber bores, the half beads surrounding the coolant-contact areas are pressed against the opposed surfaces mentioned above, to seal the coolant-contact areas and prevent the cooling water from flowing from the coolant-contact areas over the half beads to other parts.

Since the coolant-contact areas are provided with the holes, the cooling water contacts the inner surfaces of the holes to remove the heat from the bead plates. The cooling water flows through the holes and contacts the intermediate plate as well to remove the heat, which is transmitted from the high-temperature gas in the combustion chambers to the intermediate plate, whereby the intermediate plate is cooled. A total inner circumferential surface area of the holes is made sufficiently larger than that of, for example, one hole in the coolant-contact areas having the same passage area, so that the cooling of the bead plates and intermediate plate is done efficiently without reducing the rigidity and strength of the circumferential portions of the combustion chamber bores. Since the number and inner diameter of the holes can be set properly during the designing of the gasket, the metal gasket cooling level can be regulated easily in advance.

Since the bead plates are provided with the holes, it is not necessary to remove the layer of coating of a heat resisting material which is formed on the surfaces of the bead plates. The cooling water directly contacts the inner surfaces of these holes and removes heat from the bead plates, whereby an increase in the temperature of the bead plates can be prevented.

In a structure in which the holes are made in the mutually opposed coolant-contact areas of the bead plates with such holes not formed in the intermediate plate, the cooling water sent from suitable water jackets in the cylinder head and cylinder block does not pass through the metal gasket but is shut off. The cooling water contacts the holes in the coolant-contact areas of the bead plate on the respective sides and one surface of the intermediate plate to cool these parts, and is circulated through the water jackets.

In a structure in which holes are made in the intermediate plate correspondingly to the holes in the bead plates, a flow of cooling water from the water jacket in one of the cylinder head and cylinder block to the other occurs since the holes in the bead plates and those in the intermediate plate communicate with each other. During the passage of the cooling water, the holes throttle the flow of the cooling water from one side to the other to render the flow of the cooling water proper. During the passage of the cooling water, it contacts the bead plates and intermediate plate and cools them properly so that these plates have a uniform temperature distribution. In any of these structures, the metal gasket can be cooled from both the cylinder head side and the cylinder block side, and the cooling efficiency is improved.

When the coolant-contact areas of the bead plates are provided on the portions thereof which are in the vicinity of adjacent combustion chambers or on the portions thereof which are in the vicinity of regions in which the swirl chambers of the combustion chambers are positioned, the temperature of which becomes extremely high as mentioned above, the coolant-contact areas can cool these portions in a specially concentrated manner.

Since the portions of the metal gasket which are around the combustion chamber bores are provided with a plurality of holes, the rigidity and strength of the same portions is increased as compared with those of similar portions which are provided with, for example, a single hole the area of which is equal to a total area of the mentioned plurality of holes. Accordingly, the metal gasket is cooled efficiently at the coolant-contact areas thereof which are exposed to a high-temperature combustion gas, and the degree of decrease in the rigidity and strength of the coolant-contact areas can be minimized. Therefore, this metal gasket has excellent construction and a high heat resistance, and is free from the occurrence of cracks ascribed to thermal stress and is capable of improving the sealing function and durability. As a result, according to the present invention, a metal gasket having a simple construction, capable of being manufactured at a low cost and having high sealing performance and reliability can be provided.

In a conventional metal gasket, the portions thereof which are in the vicinity of both of adjacent combustion chambers, or the regions thereof in which the swirl chambers are positioned are liable to have an extremely high temperature since a large amount of heat from a high-temperature combustion gas is supplied thereto as previously mentioned. Consequently, cracks and a decrease in the sealing performance occur in these parts in a concentrated manner earlier and more readily than in other parts.

However, the metal gasket according to the present invention is provided with coolant-contact areas and holes in high-temperature regions mentioned above, so that the coolant-contact areas and holes can cool these high-temperature portions in a specially concentrated manner. This enables the occurrence of cracks ascribed to thermal stress to be prevented, the high-level sealing function to be maintained for a long period of time, and the durability of the gasket to be improved.

BRIEF DESCRIPTION OF THE DRAWINGS

FIG. 13 illustrates the thin coating layer 38 on one of the bead base plates 21, 22.

DESCRIPTION OF THE PREFERRED EMBODIMENTS

Figure 9:
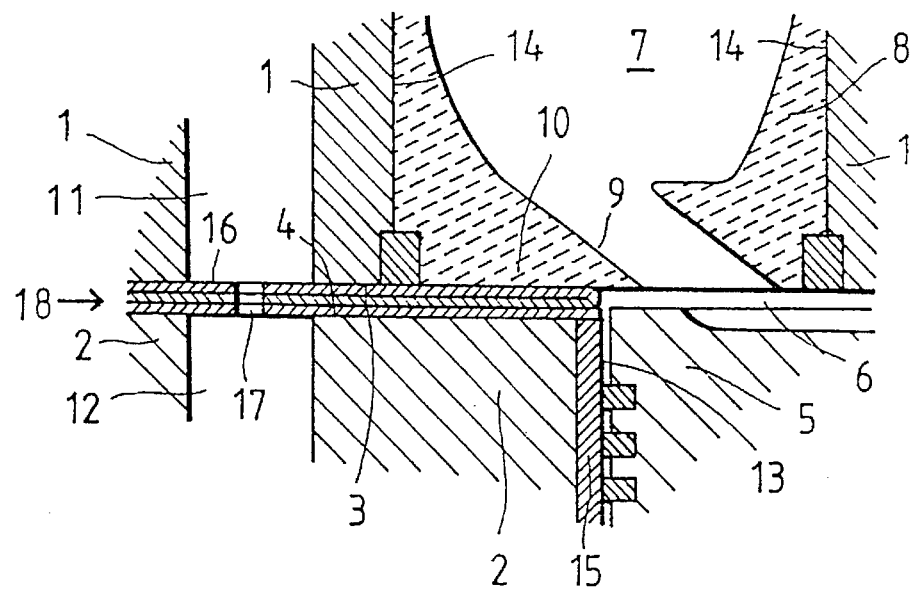
FIG. 9 is a sectional view showing a metal gasket, which is provided between opposed surfaces of a swirl chamber-carrying engine, relatively to the position of the swirl chamber.
Figure 10:
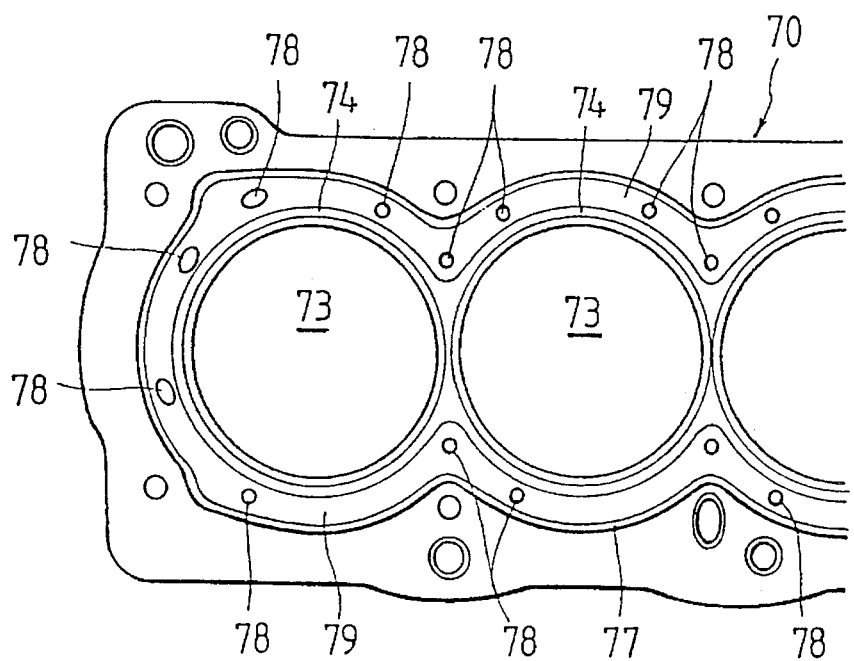
FIG. 10 is a plan view showing an example of a conventional metal gasket.
Figure 11:
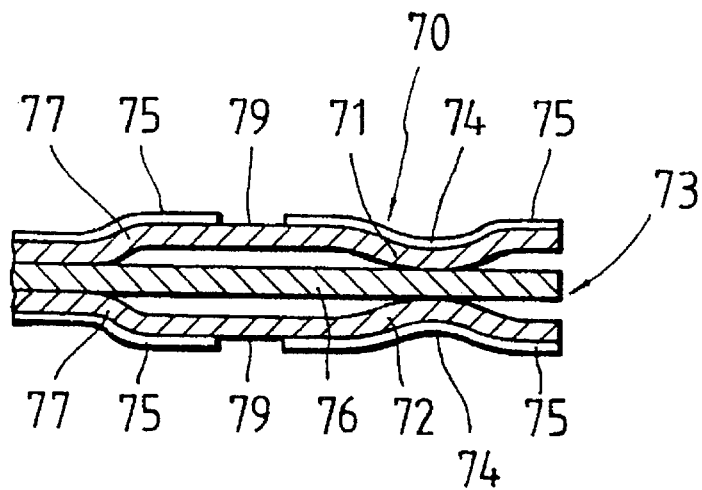
FIG. 11 is a partial sectional view showing a portion including coolant-contact areas of the metal gasket of FIG. 10.
Figure 12:
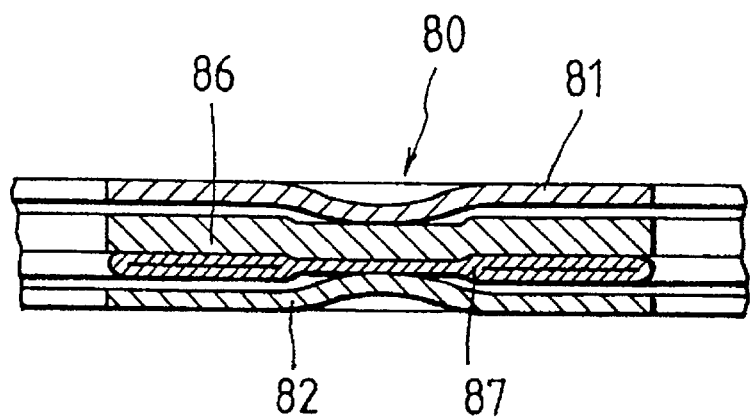
FIG. 12 is a sectional view showing another example of a conventional metal gasket.

The embodiments of the metal gasket according to the present invention will now be described with reference to the drawings. A metal gasket 20 according to the present invention is used by being interposed between opposed surfaces 3, 4 of a cylinder head 1 and a cylinder block 2 so as to seal these opposed surfaces 3, 4 in a multicylinder engine a part of which is shown in section in FIG. 4 (or FIG. 9).

Figure 1:
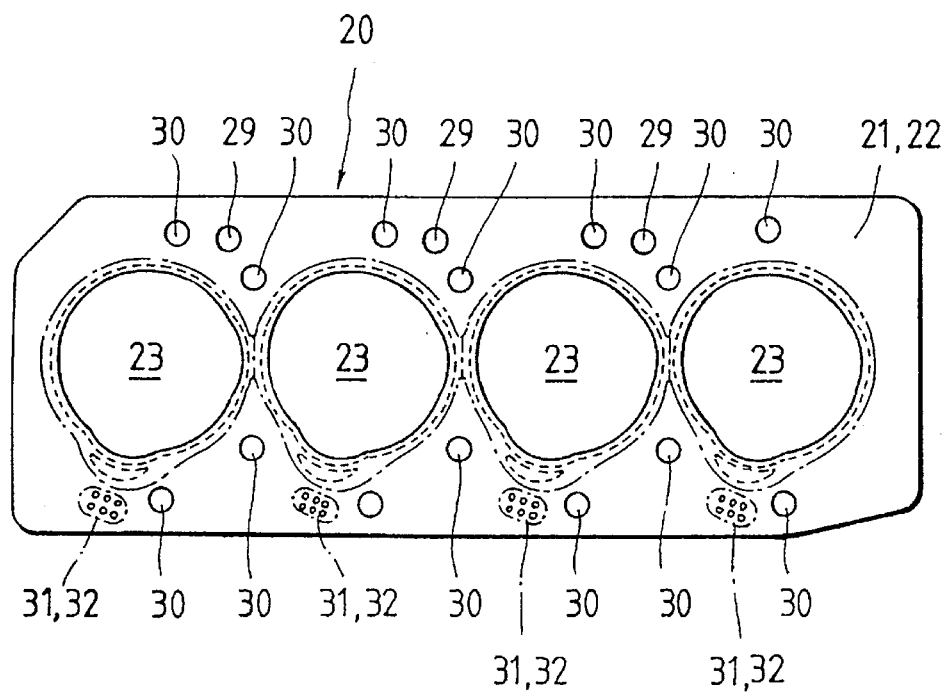
FIG. 1 is a schematic plan showing one embodiment of the metal gasket according to the present invention.
Figure 3:
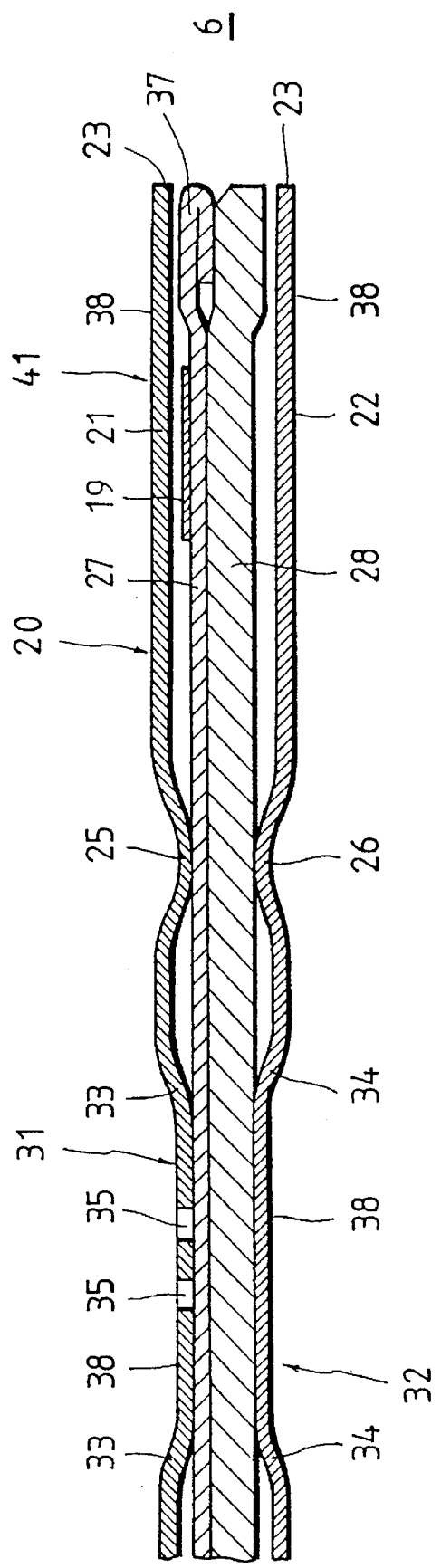
FIG. 3 is a sectional view showing the embodiment of the metal gasket taken along the line A—A in FIG. 2.
Figure 4:
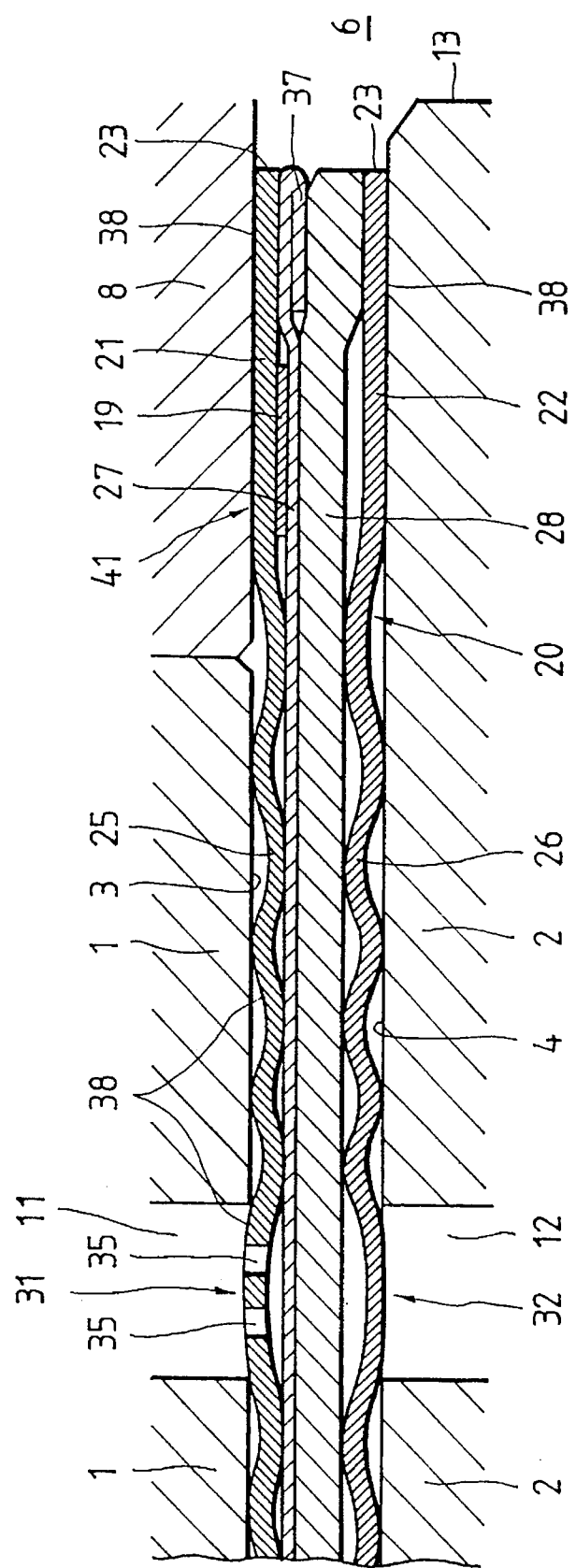
FIG. 4 is a sectional view showing the condition of the metal gasket of FIG. 3 inserted between a cylinder block and a cylinder head.

The metal gasket 20 is formed by laminating a bead plate 21 comprising an elastic metal plate to be disposed on the side of the cylinder head 1, i.e., on the upper side and a bead plate 22 comprising an elastic metal plate to be disposed on the side of the cylinder block 2, i.e., on the lower side, and inserting in a sandwiched state intermediate plates 27, 28 between the two bead plates 21, 22. A shim 19 is provided as shown in FIGS. 3 and 4, between the bead plate 21 and the intermediate plate 27 having a folded portion 37. The intermediate plate 27 is formed to a thickness smaller than that of the intermediate plate 28, and has a folded portion 37 formed by bending a combustion chamber-side part thereof to a predetermined width, the intermediate plate 27 as a whole being laminated closely on the intermediate plate 28. The metal gasket shown in FIG. 1 is a metal gasket used for a four-cylinder engine. If combustion chamber bores are formed correspondingly to the number of cylinders, this metal gasket can be applied to a multicylinder engine.

The bead base plates 21, 22 are formed by punching metal plates of, for example, SUS 301, forming beads and molding of various holes in the resultant metal plates, and then subjecting it to a heat treatment so that the tensile strength, elongation and hardness of the plates reach predetermined levels. The intermediate plates 27, 28 are formed by punching metal plates of, for example, SUS 304 or SPC (SECC, SUS 430), forming in the resultant plates folded portions and stepped portions, and then subjecting the resultant products to a heat treatment as necessary.

The bead plates 21, 22 and intermediate plates 27, 28 in the metal gasket 20 are provided with combustion chamber bores 23 correspondingly to the combustion chambers formed in an engine. The combustion chamber bores 23 are formed in a mutually opposed state, in the same positions and to the same size. The bead plates 21, 22 and intermediate plates 27, 28 have knock holes and grommet fixing holes formed in addition to and in the same manner as the oil passing holes 29 and bolt holes 30.

Figure 2:
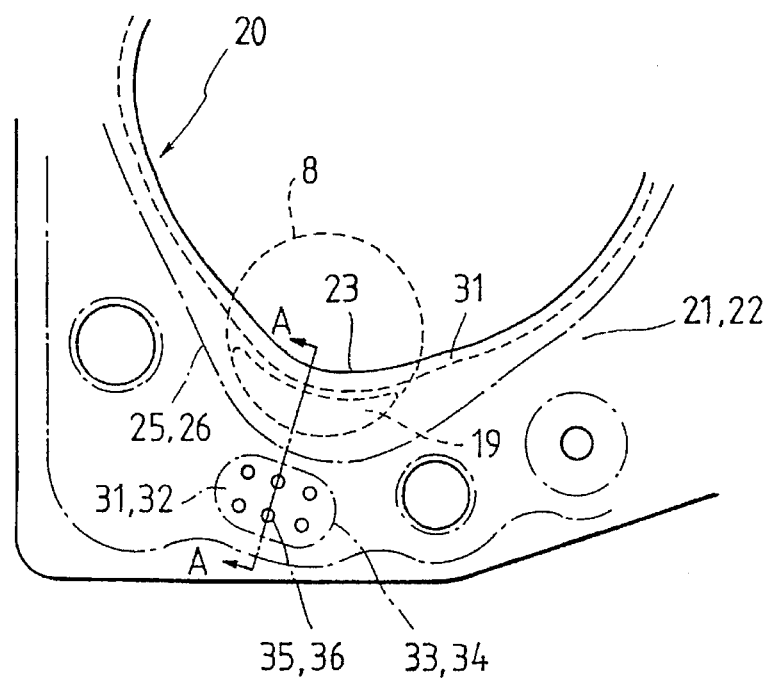
FIG. 2 is an enlarged plan showing on an enlarged scale a portion, which includes a coolant-contact area, of the metal gasket of FIG. 1.

On the portions of the bead plates 21, 22 which are around the combustion chamber bores 23, beads 25, 26 protrude toward the intermediate plates 27, 28, and these beads 25, 26 extend outward greatly at the portions thereof which are near a hot plug 8 as shown in FIG. 2. The portions of the bead plates 21, 22 which are other than the regions of the beads 25, 26 are in a free state, i.e., in a non-contacting state with respect to the intermediate plates 27, 28, and the portions of the bead plates which are near the holes, such as the oil holes 29 and bolt holes 30 are provided with half beads 33, 34 and the portions of the metal gasket 20 which are on the outer side of the half beads 33, 34 extend to the outer circumference thereof.

The surfaces of the bead plates 21, 22 in the metal gasket 20 are coated with a layer 38 (FIG. 13) of a heat resisting material comprising a nonmetallic material, such as heat resisting and oil resisting rubber (for example, fluororubber) and resin. The heat resisting material is applied to, for example, the outer surfaces of the bead plates 21, 22 to a thickness of around 20μ, and to the inner surfaces thereof which are opposed to the intermediate plates to a thickness of around 10μ. The heat resisting material of coating avoids the metal-to-metal contacting condition of the cylinder head 1 and cylinder block 2, and secures the corrosion resistance, durability and strength of the metal gasket 20. The heat resisting material of coating makes flat the mechanically processed surfaces of the metal gasket 20 even when minute recesses and projections exist in and on the same surfaces, and sufficiently fulfils its sealing function.

The above-described construction of the metal gasket is a basic construction common to the embodiments to be described below.

An example of a coolant-contact area 31 of the metal gasket 20 will now be described with reference to FIGS. 3 and 4. FIG. 3 is a sectional view taken along the line A—A in FIG. 2, showing a portion of the metal gasket 20 which extends from a combustion chamber bore 23 to the outer circumference via a coolant-contact area 31. FIG. 4 shows the metal gasket 20 interposed and pressed between the opposed surfaces 3, 4 of a cylinder head 1 and a cylinder block 2. In this drawing, the bead plates 21, 22 are shown in complicated shaped or the elastic deformation of these plates 21, 22 is illustrated exaggeratively as if large clearances actually occurred therebetween but little clearances occur in practice.

When the metal gasket 20 is interposed between the cylinder head 1 and cylinder block 2 and tightened by bolts inserted into the bolt holes 30, a tightening surface pressure increases to a high level in the portion of the gasket 20 which is in the vicinity of a primary chamber and a swirl chamber (refer to reference numerals 6, 7 in FIG. 9) since this portion has a large thickness owing to a folded portion 37 of an intermediate plate 27 as shown in FIG. 4, whereby a seal portion of a large width is formed with respect to the leakage of a combustion gas. On the outer side of the folded portion 37 of the internal plate 27, the beads 25, 26 on the bead plates 21, 22 are also compressed, so that they are pressed forcibly against the opposed surfaces 3, 4 to form secure seal portions. Owing to these multiple concentric annular seal portions, high-temperature high-pressure combustion gas from the combustion chamber bore 23 can be prevented from leaking to the opposed surfaces 3, 4. The irregularity occurring on the opposed surfaces 3, 4 of the cylinder head 1 and cylinder block 2 is offset by the beads 25, 26 and coating layers 38, and an amount of strain of the cylinder head 1 occurring due to the repetition of explosion and expansion strokes of the engine during a combustion cycle is minimized. The edges of various kinds of holes around the beads 25, 26 are pressed forcibly against the opposed surfaces 3, 4 owing to the deformation of half beads to seal the same edges.

The bead plates 21, 22 are provided with full beads 25, 26 extending from the combustion chamber bore 23 in a horizontally projecting manner around a high-temperature region 41 which bulges due to a hot plug 8, and ridging toward the intermediate plates 27, 28. At the portions of the bead plates which are in the vicinity of the regions 41 and on the immediately outer side of the beads 25, 26, substantially rectangular or elliptic coolant-contact areas 31, 32 are provided in a sporadically distributed manner. The coolant-contact areas 31, 32 are provided in a position in which a water jacket 11 in the cylinder head and that 12 in the cylinder block 2 are opened, and half beads 33, 34 surrounding the coolant-contact areas 31, 32 as a whole in a position which surrounds the openings of the water jackets 11, 12 completely. In this metal gasket 20, the inner portion surrounded by the half bead 33 on the bead plate 21 positioned on the side of the cylinder head 1, i.e. the coolant-contact area 31 is provided with a plurality (six in the embodiment of FIG. 1) of small holes 35.

The inner diameter of the small holes 35 is set to a suitable size in accordance with the type of the engine, whereby the level of cooling heat can be set, the inner diameter of these small holes 35 being set to a sufficiently low size as compared with the holes provided in other regions. The sum of the cross-sectional areas of the interior of the small holes 35 can be set equal to or larger than the cross-sectional area of the interior of a single hole in a metal gasket in which this single hole constitutes a coolant-contact area 31 formed on the same scale. Since the small holes 35 have a small inner diameter, they can be distributed easily even in a narrow region, so that the rigidity and strength of a structure of a region in which the coolant-contact area 31 is provided are not reduced, whereby the heat can be removed efficiently. In this embodiment, the intermediate plate 27 is not provided with a water passing bore communicating with the small holes 35, and a flow of cooling water from the water jacket 11 in the cylinder head 1 to that 12 in the cylinder block 2 is shut off, the intermediate plate 27 fulfilling the function of a shield member.

When the metal gasket 20 is interposed between the opposed surfaces 3, 4 of the cylinder head 1 and cylinder block 2 and tightened as shown in FIG. 4, the half beads 33, 34 for the coolant-contact areas 31, 32 are pressed against the edge portions of the water jackets 11, 12 in the cylinder head 1 and cylinder block 2 to form seal portions. Since the cooling water from the water jackets 11, 12 does not leak from the seal portions to the outside and enter the narrow clearance between the bead plates 21, 22 and the opposed surfaces 3, 4, the occurrence of corrosion on the opposed surfaces 3, 4 and the other portions of the bead plates 21, 22 can be prevented.

The bead plates 21, 22 and intermediate plates 27, 28 receives heat from the combustion chamber bores 23 and those corresponding thereto in the intermediate plates 27, 28, all of which bores are directly exposed to the high-temperature gas in the combustion chambers 6. The heat is also transmitted directly from a bottom portion 10 of the hot plug 8, which is heated to a high temperature with the combustion gas flowing from the swirl chamber 7 thereto through the communication port 9 (refer to FIG. 9), to the upper bead plate 21. The heat mentioned above is transmitted to the interior of the metal gasket 20 and radiated mainly into the cooling water contacting the coolant-contact areas 31, 32 but the quantity of heat transferred from the metal gasket to the cooling water is comparatively small since the surfaces of the bead plates 21, 22 have layers of coating 38 of a heat resisting material. The cooling water entering the small holes 35 directly contacts the metal constituting the bead plates 21, 22 and intermediate plates 27, 28, and thus, the transfer of heat is carried out efficiently.

Figure 5:
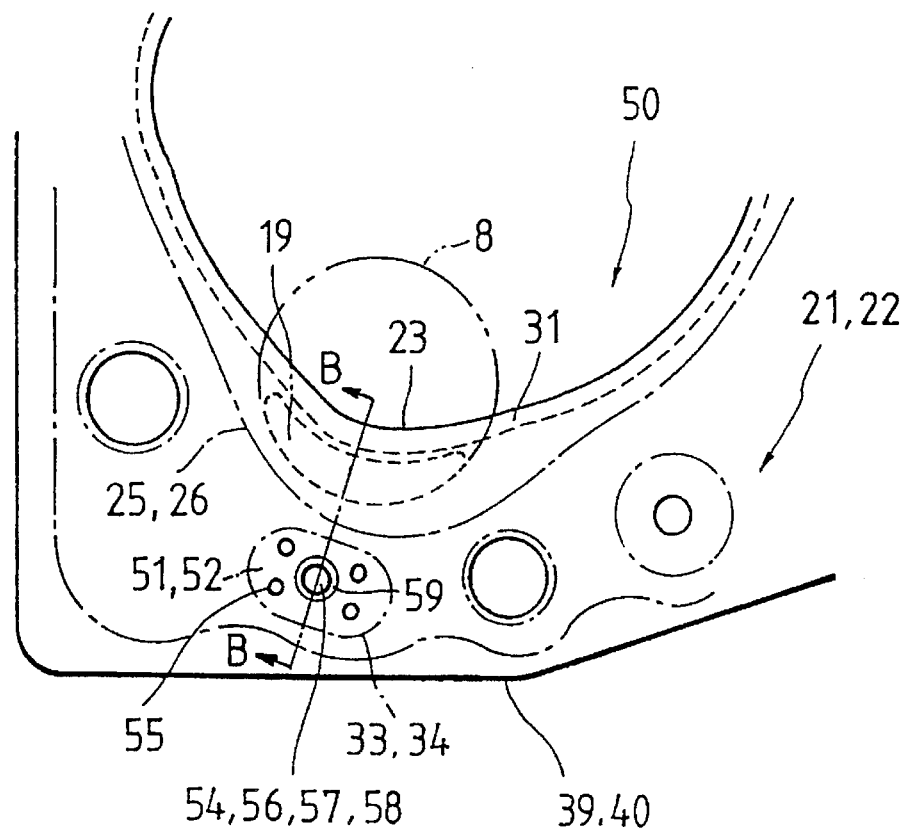
FIG. 5 is an enlarged section showing on an enlarged scale a portion including coolant-contact areas of another embodiment of the metal gasket according to the present invention.
Figure 6:
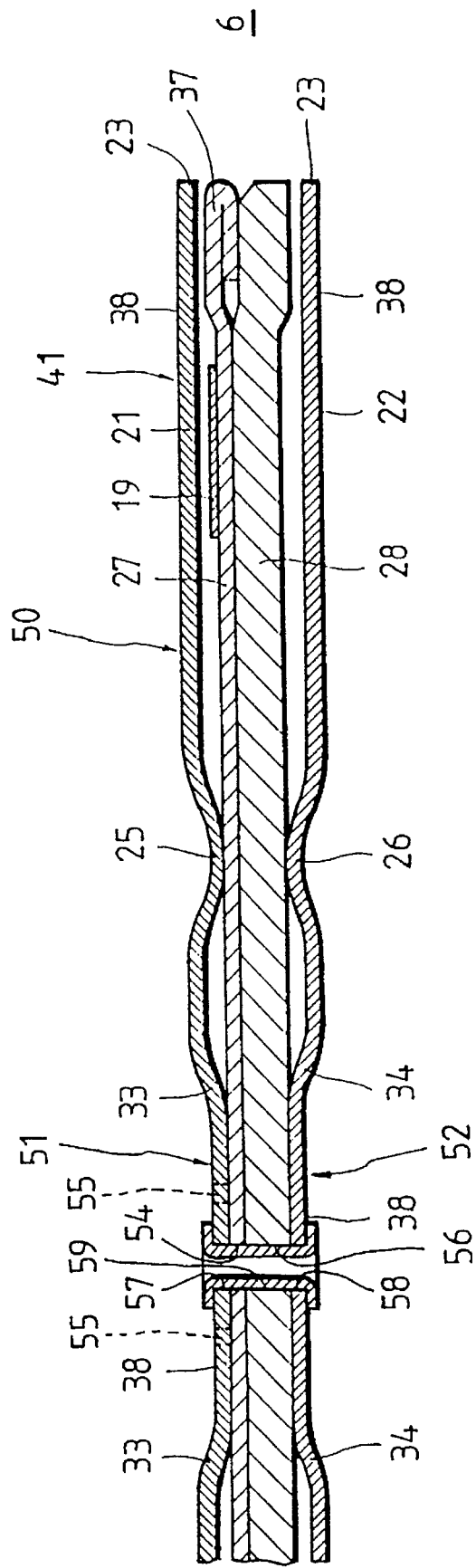
FIG. 6 is a sectional view showing the embodiment of the metal gasket taken along the line B—B in FIG. 5.

Another example of coolant-contact areas 51, 52 in a metal gasket 50 will now be described with respect to FIGS. 5 and 6. Since the basic construction of the metal gasket 50 is identical with that of the embodiment of FIGS. 3 and 4, the same constituent parts are designated by the same reference numerals, and detailed descriptions thereof are omitted.

The coolant-contact areas 51, 52 in the bead plates 21, 22 in the metal gasket 50 are identical with those 31, 32 in the bead plates 21, 22 shown in FIG. 3. The inner portion of the bead plate 21 which is surrounded by a half bead is provided with small holes 55 of a small inner diameter and holes 57, 58 of an inner diameter larger than that of the small holes 55. The intermediate plates 27, 28 are also provided in the corresponding portions thereof with holes 54, 56 of the same inner diameter. Grommets 59 are fitted in these holes 54, 56, 57, 58 and both ends thereof are caulked, whereby the bead plates 21, 22 and intermediate plates 27, 28 are fixed to each other. The holes 54, 56, 57, 58 in which the grommets 59 are fitted are positioned in the central portions of the coolant-contact areas 51, 52 in the illustrated embodiment but the positions of these holes can be determined suitably in accordance with the size and number of the coolant contact areas 51, 52. A small hole may be formed in the coolant-contact area 52 of the bead plate 22. Small water passing holes may also be formed in the intermediate plates 27, 28 correspondingly to the small holes 55 in the bead plates 21, 22.

In this embodiment, the bead plates 21, 22 and intermediate plates 27, 28 do not come out of alignment with each other even when they are tightened between the cylinder head and cylinder block. The positional relation between the cool-and-contact areas 51, 52 and the openings of the water jackets 11, 12 can be kept stable. When water passing holes are provided in the intermediate plates 27, 28, the positional relation of these holes and the small holes 55 can also be kept stable. Since these plates are fixed by the grommets 59, the rigidity and strength of the coolant-contact areas 51, 52 can be improved. Since the holes 54, 56, 57, 58 into which the grommets 59 are fitted extend naturally through the intermediate plates 27, 28, the bores of the grommets 59 form water passing holes, so that the cooling water flows through the cylinder head and cylinder block.

Figure 7:
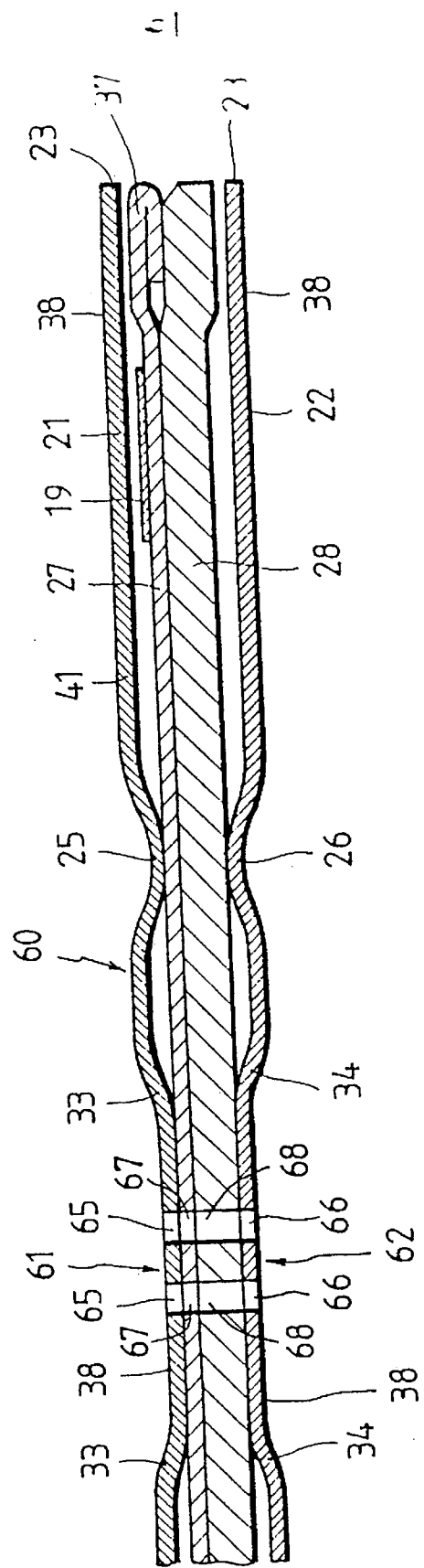
FIG. 7 is an enlarged section showing on an enlarged scale a portion including coolant-contact areas of still another embodiment of the metal gasket according to the present invention.

Still another example of coolant-contact areas 61, 62 in a metal gasket 60 will now be described with reference to FIG. 7. Since the basic construction of the metal gasket of FIG. 7 is identical with that of the metal gasket of FIG. 3, the same constituent parts are designated by the same reference numerals, and detailed description thereof are omitted.

The metal gasket 60 has half beads 33, 34 and coolant-contact areas 61, 62 formed in the bead plates 21, 22, and small holes 65, 66 are made in the coolant-contact areas 61, 62. Small water passing holes 67, 68, the number and positions of which are in accordance with those of the small holes 65, 66, are formed in the intermediate plates 27, 28. Accordingly, the cooling water becomes able to flow from the cylinder head to the cylinder block, or in the reverse direction, so that the cooling efficiency is improved. It is not necessary that the intermediate plates 27, 28 be provided with the small holes 67, 68 correspondingly to all of the small holes 65, 66, and providing the small water passing holes 67, 68 or not providing them may be determined properly taking the distribution of heat into consideration.

Figure 8:
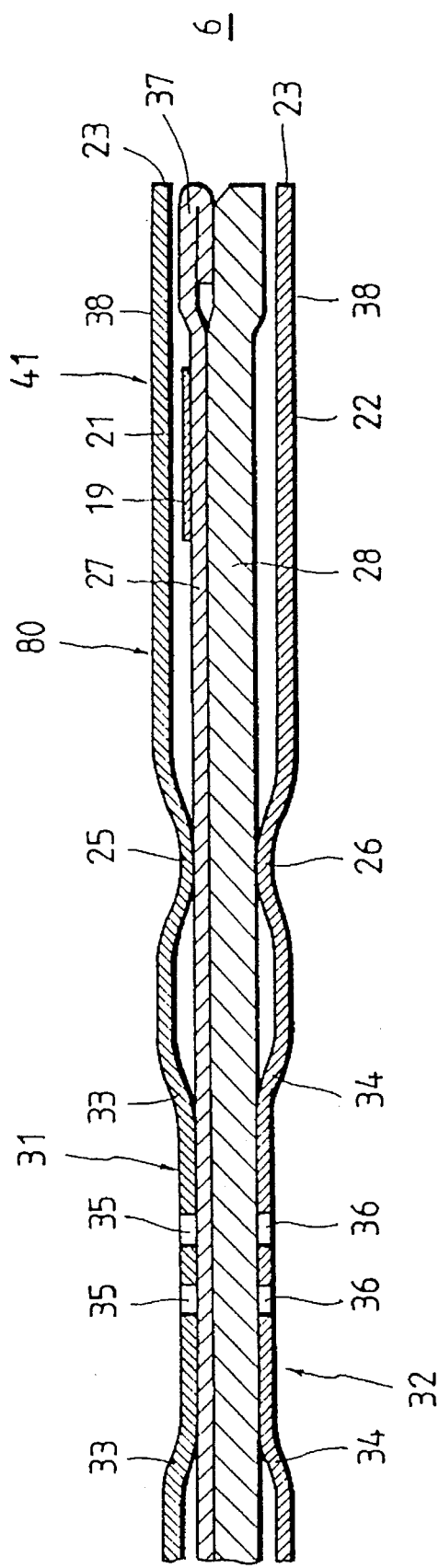
FIG. 8 is an enlarged section showing on an enlarged scale a portion including coolant-contact areas of a further embodiment of the metal gasket according to the present invention.

Another example of coolant-contact areas 31, 32 in a gasket 80 will now be described with reference to FIG. 8. Since the basic construction of the gasket of FIG. 8 is identical with that of the gasket of FIG. 3, the same constituent parts are designated by the same reference numerals, and detailed descriptions thereof are omitted.

In this metal gasket 80, small holes 35, 36 are provided in a coolant-contact area 31 in a bead plate 21 on the side of a cylinder head and a coolant-contact area 32 in a bead plate 22 on the side of a cylinder block respectively. The metal gasket 80 has the same construction and function as the previously-described metal gaskets except that the small holes 35, 36 are formed in the two bead plates 21, 22, and descriptions of the construction and function are omitted.

What is claimed is:

1. A metal gasket to be used by being interposed between opposed surfaces of a cylinder block and a cylinder head fixed to the cylinder block, the gasket comprising:

a pair of bead plates formed by elastic metal plates and intermediate plates interposed between said bead plates, said bead plates and said intermediate plates being provided with combustion chamber bores, said bead plates being provided with beads along the circumferential edges of said combustion chamber bores, portions of said bead plates in which the temperature becomes locally high being provided with coolant-contact areas which the cooling water flowing in water jackets formed in said cylinder head and said cylinder block contacts, said coolant-contact areas of said bead plates being provided with annular half beads surrounding said coolant-contact areas, said coolant-contact areas within said annular half beads of said bead plates being provided with holes, the surfaces of the portions of said intermediate plates which are opposed to said holes contact the cooling water flowing in said water jackets, and said holes in said coolant-contact area of said bead plate being formed in the bead plate that is positioned on the side of said cylinder head.

2. The metal gasket according to claim 1, wherein said intermediate plates interposed between said bead plates are provided with holes in the portions thereof which are opposed to said holes formed in said coolant-contact areas of said bead plates.

3. The metal gasket according to claim 1, wherein, in said coolant-contact areas formed on said bead plates, portions of said bead plates and said intermediate plates are fixed to each other by grommets.

4. The metal gasket according to claim 1, wherein the bead plates are provided with a layer of coating formed by applying a heat resisting material thereto.

5. The metal gasket according to claim 4, wherein said layer of coating is provided on said coolant-contact areas of said bead plates.

6. The metal gasket according to claim 1, wherein said holes in said coolant-contact areas of said bead plates are formed in at least said bead plate positioned on the side of said cylinder head, the portions of said intermediate plate which correspond to said hole-carrying portions of said bead plate constituting shield members for shutting off a flow of cooling water between said water jackets in said cylinder block and said cylinder head.

7. The metal gasket according to claim 1, wherein said intermediate plates interposed between said bead plates include a first intermediate plate and a second intermediate plate laminated on said first intermediate plate.

8. The metal gasket according to claim 1, wherein a first intermediate plate positioned on the side of said cylinder head is provided with folded portions formed by bending the portions thereof which extend along said combustion chamber bores.

9. The metal gasket according to claim 1, wherein said portions of said bead plates in which the temperature becomes locally high are portions thereof in the vicinity of swirl chambers formed in said cylinder head.

10. A metal gasket according to claim 1, wherein said holes in said coolant-contact areas of said bead plates are formed in said bead plates positioned on the side of said cylinder block.

* * * * *